(12) United States Patent
Erving et al.

(10) Patent No.: US 7,058,147 B2
(45) Date of Patent: Jun. 6, 2006

(54) EFFICIENT REDUCED COMPLEXITY WINDOWED OPTIMAL TIME DOMAIN EQUALIZER FOR DISCRETE MULTITONE-BASED DSL MODEMS

(75) Inventors: Richard H. Erving, Piscataway, NJ (US); Lalitha Sankaranarayanan, Morris Plains, NJ (US)

(73) Assignee: AT&T Corp., New York, NY (US)

( * ) Notice: Subject to any disclaimer, the term of this patent is extended or adjusted under 35 U.S.C. 154(b) by 809 days.

(21) Appl. No.: 09/794,113

(22) Filed: Feb. 28, 2001

(65) Prior Publication Data

US 2002/0154716 A1 Oct. 24, 2002

(51) Int. Cl.
*H03D 1/06* (2006.01)
*H03D 11/04* (2006.01)
*H03K 5/01* (2006.01)
*H03K 6/04* (2006.01)
*H04B 1/10* (2006.01)

(52) U.S. Cl. .................. 375/348; 375/285; 375/350; 375/232

(58) Field of Classification Search ............. 375/224, 375/229, 231, 232, 285, 316, 346, 348, 350
See application file for complete search history.

(56) References Cited

U.S. PATENT DOCUMENTS

| 5,228,058 | A | * | 7/1993 | Ushirokawa et al. ....... 375/232 |
| 5,461,640 | A | | 10/1995 | Gatherer |
| 5,621,768 | A | * | 4/1997 | Lechleider .................. 375/346 |
| 6,396,886 | B1 | * | 5/2002 | Kapoor ........................ 375/350 |
| 6,404,806 | B1 | * | 6/2002 | Ginesi et al. ................ 375/222 |
| 6,408,022 | B1 | * | 6/2002 | Fertner ........................ 375/230 |
| 6,671,313 | B1 | * | 12/2003 | Rached et al. .............. 375/224 |
| 6,724,849 | B1 | * | 4/2004 | Long et al. .................. 375/371 |
| 6,778,618 | B1 | * | 8/2004 | Celebi ......................... 375/346 |
| 2002/0181549 | A1 | * | 12/2002 | Linnartz et al. ............ 375/142 |

* cited by examiner

Primary Examiner—Jean B. Corrielus

(57) ABSTRACT

An algorithm for computing an efficient, reduced complexity, windowed optimal linear time domain equalizer for a dispersive channel comprises the steps of determining a window of maximum energy in the impulse response of length equal to or less than a number of cyclic prefix samples associated with a received digital data signal, computing the corresponding inside and outside matrices, performing an inverse Cholesky decomposition of the inside matrix, creating a resultant matrix as the product of the outer and the upper and lower square root inner matrix, followed by Householder reduction and QL transformation to thereby compute the time domain equalizer as the linear transformation of the eigenvector corresponding to the smallest eigenvalue at the receiver. The smallest eigenvalue is determined using the aforementioned orthogonal transformations without determining all the eigenvalues efficiently but without the loss accuracy associated with iterative methods like the conventional power method. The algorithm may be most conveniently implemented, for example, in the form of a thirty-two bit digital signal processor at a data receiver.

4 Claims, 4 Drawing Sheets

EFFICIENT REDUCED COMPLEXITY WINDOWED OPTIMAL TIME DOMAIN EQUALIZER FOR DISCRETE MULTITONE-BASED DSL MODEMS

FIELD OF THE INVENTION

The invention relates to an efficient reduced complexity, windowed, optimal time domain equalizer for discrete multitone-based DSL modems.

BACKGROUND OF THE INVENTION

Digital Subscriber Line (DSL) is a technology that provides high-speed communications using telephone lines. The technique requires the use of a wide band of frequencies to send more information than conventional voice calls require. Wideband modulation schemes need to take into account the broadband characteristics of the medium used to communicate. Twisted pair copper wire subscriber loops used to provide access to the local exchange in telephone circuits exhibit frequency dependent attenuation, with higher frequencies suffering more attenuation than the lower ones. Further, these subscriber loops also exhibit a non-linear phase response with frequency, with the lower frequencies exhibiting more non-linearity. This kind of channel characteristic results in the dispersion of an impulse, sent by the transmitter, at the receiver, thus corrupting the reception. This dispersion, also referred to as inter-symbol interference (ISI), results in data loss and hence, loss of communication reliability.

A channel's limited bandwidth has a dispersive effect on the transmitted pulse. High-frequency loss in the channel tends to reduce the slope of the pulse edges resulting in finite rise times (precursor distortion). At low frequencies, the nonlinear phase characteristics tend to produce a long decay tail (postcursor distortion), resulting in a smeared pulse shape. The "available" bandwidth and the phase characteristics of a channel are solely a function of the medium used. Distortion suffered by a given pulse results in interference to its neighbors in time. A given pulse is distorted by the presence of tails from past pulses and precursors of future pulses. This effect is known as inter-symbol interference (ISI). Thus, at the receiver, detection of symbols is further complicated by the presence of pulse distortion in addition to noise. For a given channel, since the channel attenuation and noise characteristics can be determined a priori, ISI can be eliminated by predicting the channel's future and past influence on any received symbol. The process of eliminating ISI from the received data is referred to as equalization.

Discrete multi-tone modulation (DMT) is an orthogonal frequency-division multiplexing (OFDM) technique. It was introduced by Ebert and Weinstein and later improved by Peled and Ruiz to take advantage of digital signal processors and fast Fourier transform (FFT) processes. DMT is generally used to refer to an FFT-based multi-carrier modulation scheme for high-speed data transmission in a wired environment such as the digital subscriber line (DSL). A host of high-speed transmission standards such as ADSL (Asymmetric DSL), HDSL (High-speed DSL), VDSL (Very high-speed DSL), and so on use DMT as the modulation technique.

Discrete multi-tone modulation is based on modulating bits on a sequence of N baseband tones (also known as sub-channels or bins), generally evenly spaced. Modulation involves mapping the $b_i$ bits in the $i^{th}$ bin to a complex number chosen from a corresponding $2^{b_i}$ QAM (quadrature amplitude modulation) constellation. The modulated bins and the corresponding complex conjugate bins are then inverse Fourier transformed (IFFT) to generate 2N real time samples constituting a symbol. Thus for a baseband system of total allowed bandwidth W, the symbol time is $2N/2W=1/f_c$ for the case of Nyquist sampling where $f_c$ is the frequency spacing between bins. For example, the ADSL standard uses N=256 bins that span a bandwidth of 1.104 MHz resulting in a frequency spacing of 4.3125 kHz. AT&T Corporation has been developing its version of DMT-based DSL technology called the Tethered Virtual Radio Channel (TVRC).

Referring briefly to FIG. 5, there is shown a block schematic diagram of a conventional TVRC modem which may be located either at a telephone central office (CO) or as customer premises equipment (CPE). A difference between the CO TVRC modem and a CPE TVRC modem is that the CPE modem receives its clock from the CO modem.

TVRC differentiates itself from ADSL by offering duplex T1-like service for loops up to twelve thousand feet of twenty six gauge (AWG) wire cable pairs and graded service for longer lengths. TVRC, like ADSL, uses DMT as the baseband modulation scheme. The Multiple Turbo Trellis coded modulation (MTTCM) scheme of inner coder 510 developed by AT&T gives a significant signal-to-noise ratio (coding gain) advantage over the Wei coder recommended in the standards for constellation sizes from 4 to 256 with the largest gains for QPSK. Further, unlike ADSL, TVRC is a full-band duplex communication system using the same band for both upstream and downstream communications. It may or may not be symmetric depending on the channel conditions that determine the bit and power allocation profiles for the up and downstream channels. The outer coder 505 is the standards recommended Reed-Solomon coder with the design chosen to maintain error levels at one in $10^9$ bits. The digital broadband Echo Canceller 535 developed for the duplex channel along with the analog hybrid ensures echo-interference-free duplex communications.

Bit distribution in each sub-channel is determined from the channel attenuation and noise characteristics measured during initialization using a known pseudo-random (PN) sequence. The well-known water-pouring algorithm of adding power proportional to the channel terrain has been modified by Sonalkar and Sankaranarayanan as a constrained allocation of bits and hence, power subject to a total power budget of 100 mW and a power spectral mask constraint defined by the Federal Communications Commission for the Asymmetric Digital Subscriber Line (ADSL) standards. A computationally fast algorithm using bit removal instead of bit-by-bit allocation has been adopted. Channel attenuation is measured at the receiver as the ratio of the received PN sequence to the known transmitted sequence and the noise profile is measured at the receiver with the transmitter silent. Duplex versions of the above algorithm have also been developed by Sonalkar et al. to solve the problem of joint bit allocations to the upstream and downstream channel. The information on the bit and power profile is communicated back to the transmitter by the receiver during initialization.

The incoming bit stream at the transmitter 500 after scrambling is Reed-Solomon (RS) encoded. The RS encoder 505 used is a (136, 136-R) coder where 136 is an example of the number of output bytes and R is twice the number of symbols that can be corrected. The choice of R determines the effective system bit error rate (BER) for a given inner coder BER. The RS coder 505 in the TVRC transmitter design of FIG. 5 uses a symbol of length 8 bits, i.e., a byte.

The 136-byte output of the RS encoder 505 results in an input block of 1088 bits to the Turbo encoder 510. The Turbo encoder 510 uses the bit allocation profile to map $b_i$ bits at a time from the incoming bit stream, encode them with the appropriate number of parity bits and map the resultant bits to a complex number from a 256-point constellation. When all B=$\Sigma b_i$, where i=1, 2, . . . , 256, total bits per symbol are read, the bit table is reset to the start to continue encoding the Turbo input block of 1088 bits until no more bits are left to encode. The bins with no bits are not modulated, i.e., zero power is sent on such bins. The result is a continuing vector of complex values which when taken 256 at a time, scaled by the appropriate power values, complex conjugated and inverse fast Fourier transformed (IFFT) at IFFT 520 yields a 512-point vector of time samples.

Prefixing the last 32 time samples of the 512-sample frame to the start of the frame ensures that for a shortened 32-tap channel the data appears periodic to the channel and thus, at the receiver, the frequency bins of the prefix discarded 512-sample FFT will remain orthogonal. If x(n) is an N-sample vector transmitted with a CP-sample cyclic prefix, h(n) is the channel response, and X(n) and H(n) are the discrete Fourier transforms of x(n) and h(n) respectively, then at the receiver, the discrete transform relationship:

$$x(n) * h(n) \xleftrightarrow{FFT} X(n) \cdot H(n) \qquad (1)$$

holds iff x(n) is either an infinite sequence of samples (infinite block length) or if x(n) is periodic with period N. Constraining the channel to be non-zero for only CP-samples and using a cyclic prefix of length CP for each block N samples result in the data appearing periodic to the channel, thus eliminating receiver inter channel interference (ICI) as shown subsequently herein. Interpolation and parallel-to-serial conversion of the time samples followed by digital to analog conversion completes the processing of data at the transmitter.

At the receiver 550, the digitized data coming through the hybrid 540 and the analog front end is decimated down to baseband. The decimated time samples are buffered 544 (N+CP) at a time and digitally filtered with the time domain equalizer (TEQ) 560 determined during initialization to shorten the channel to 32 or less taps. For a duplex system, echo cancellation via echo canceller 535 is done to eliminate the echo leakage from the transmitter 500. This is followed by the removal of the cyclic prefix of 32 samples. An FFT 575 of the remaining 512 samples results in a vector of 256 complex values and their conjugates in the frequency domain. The complex frequency values are then scaled by an appropriate vector of complex numbers that ensures phase and power equalization of the received signal. This frequency domain equalizer (FEQ) 580 is also determined during initialization and equalizes (cancels) the phase distortion and power attenuation introduced by the channel. The equalized complex numbers are then fed to the Turbo decoder 585. Reed-Solomon decoding and de-scrambling via decoder 590 completes the receiver data processing and the resulting bits are streamed as appropriate for the application.

The two ends of a typical subscriber line connection are the customer premises equipment (CPE) and the local exchange also known as the central office (CO). The CPE and CO are sample and frame synchronized with each other after the CPE synchronizes its clock to the master CO clock during initialization. Downstream is the direction from the CO to the CPE and upstream indicates the reverse direction from the subscriber to the central office. Timing recovery at the CPE is done during the initial handshaking and from then on synchronization is maintained by constantly updating the parameters with the reception of the PN sequence sent as a $69^{th}$ frame after successive 68 frames of data transmission. If required, the $69^{th}$ PN frame on time-averaging, also helps adapt and update the channel-dependent parameters like the TEQ 560, the FEQ 580, the echo canceller (EC) 535, and bit and power allocation profiles. One technique for adaptively updating the channel parameters and constantly monitoring the channel is referred to as the Auto-Configuration Protocol and is one algorithm developed by members of AT&T Labs-Research that may be utilized with the present invention. Other techniques for updating channel parameters and monitoring a channel may be likewise utilized with the present invention.

Inter-symbol interference (ISI, distortion in the time-domain) and inter-channel interference (ICI, distortion in the frequency domain, also known as inter-bin interference) cause corruption of data sent over long twisted pair copper wires connecting CPE and CO. A channel's limited bandwidth causes distortion in the transmitted pulse. High-frequency loss reduces the slope of the pulse edges resulting in precursor distortion and low frequencies nonlinear channel phase response results in a long pulse tail causing postcursor distortion. This distortion creates interference in the preceding and following pulses, thus complicating the problem of symbol detection in this challenging subscriber loop environment (mixed gauges, bridge taps, noise ingress in the upstream direction among other known problems).

In DMT-based modulation for a DSL system, a pulse (symbol) is typically 512-samples long preceded by a cyclic prefix (length CP in general) of the last 32 samples of the current frame. The cyclic prefix is used to provide time domain separation of adjacent symbols. Each time domain symbol at the transmitter is the inverse Fourier transform of a band of 256 independent frequencies (bins) modulated using the parameters determined during initialization. At the receiver 550, the received time domain samples are collected a frame at a time. A Fourier transform 575 is then used to recover data in the original 256 frequency bins. If the channel impulse response is longer than 32 taps (the size of the cyclic prefix), ISI between adjacent symbols results in a loss of orthogonality between the channels (bins) in the band of modulation, and the result is ICI. Detection based on an assumption of orthogonal channels within the band no longer holds, and performance (i.e. bit error rate, data throughput) suffers.

Theoretical considerations for shortening impulse response are discussed in Melsa et al., "Impulse Response Shortening for Discrete Multitone Transceivers", published in *IEEE Transactions for Communications*, Vol. 44, No. 12, December, 1996, incorporated by reference as to its entire contents. While Melsa et al. provide a theoretical framework for our invention, this prior work failed to, for example, appreciate, disclose or suggest the computation of all eigenvalues and the determination of the smallest eigenvalue as taught by our invention, perhaps, because they perceived that the complexity of the computations precluded them from doing so or they never recognized the possibility. Nevertheless, as discussed herein, we have used this optimal strategy and reduced the complexity of the algorithm.

Thus, to maintain reliable communications at a desired error rate and data rate, it is important to minimize the ISI. This process of eliminating or minimizing ISI in time is referred to as time domain equalization and involves reversing the effects of the long dispersive channel. For the case of DMT-based DSL modems, equalization refers to the shortening of the measured channel at the receiver with a filter computed during the initial handshaking between the modem at the Central Office (CO) and the DSL modem at the customer premises. Shortening the channel to the length of the cyclic prefix which separates adjacent symbols eliminates ISI completely for the ideal case of an infinite length TEQ, but reduces it to the minimum possible for a finite filter tap length. An optimal linear solution for computing this finite length TEQ filter involves determining the smallest eigenvalue and eigenvector of a real, symmetric matrix. While theoretically this solution is optimal, the choice of the implementation technique determines the accuracy of the filter designed, and therefore, the overall system reliability.

SUMMARY OF THE INVENTION

According to one embodiment of the invention, a novel implementation technique to minimize inter-symbol interference and to determine the optimal time domain equalizer for, for example, DMT-based DSL modems to machine accurate precision is disclosed. While DMT-based DSL modems are used by way of example, the present algorithm may be generally find utility in many data transmission systems using guard bands including, for example, orthogonal frequency division multiplexing (OFDM) systems. The proposed algorithm is a routine that computes the time domain equalizer at the receiver during a handshaking, synchronization, and channel parameter initialization process between the transmitter and receiver (at CO and CPE ends of a subscriber loop) prior to steady-state data communications. Once the time domain impulse response of the channel is measured at the receiver, the linear time domain equalizer which optimally shortens the measured impulse response (i.e. minimizes ISI) is determined at the receiver by the novel reduced complexity routine. This filter is then applied to the received data (post-initialization) to minimize ISI and ensure reliable communications.

The optimal time domain equalizer is obtained mathematically as a linear transformation of the eigenvector corresponding to the smallest eigenvalue of a matrix derived from the impulse response. The routine uses an orthogonal transformation technique to determine the smallest eigenvalue and the corresponding eigenvector. A simple linear transformation of the eigenvector then yields the desired optimal time domain equalizer. The method exploits the symmetric nature of the matrix whose smallest eigenvalue and the corresponding eigenvector needs to be determined.

Currently the techniques described and used in literature use iterative methods that require an initial guess. The accuracy issues that result from guessing are eliminated by using an orthogonal transformation technique known in the art as "Householder reduction" to reduce the symmetric real matrix (whose smallest eigenvalue has to be determined) to a symmetric tridiagonal form. A tridiagonal matrix is one with non-zero values only along the main diagonal and the immediate sub- and super- diagonal. The matrix, C, the smallest eigenvalue of which has to be determined is obtained from the channel impulse response as a product of two matrices, both of which are computed from the impulse response using a window. The two matrices, referred to as the inner and outer matrix, are computed using the energy within a window of length equal to the cyclic prefix (CP samples) and the energy outside that window (512-CP samples) respectively. The optimal window chosen is the set of CP consecutive samples of the impulse response with the largest total energy. The linear time domain equalizer which, after filtering, maximizes the energy within this window of CP samples relative to the energy outside is the optimal filter. Thus, mathematically, the optimal linear filter is the filter that maximizes the energy within the window of CP samples subject to the constraint of minimizing the energy outside. Using the constrained Lagrange minimization technique, the solution is obtained by solving the generalized eigenvalue problem. The solution to this generalized eigenvalue problem is then the eigenvector corresponding to the smallest eigenvalue of the matrix C. The filter, thus determined, yields the minimum possible ISI or the maximum possible squeeze ratio for the tap length chosen. The squeeze ratio is defined as the ratio of the energy within the window of length cyclic prefix (CP) of the time equalized (shortened) impulse response to the energy outside that window. This ratio is also referred to as the shortened signal-to-noise ratio (SSNR) and is equal to the inverse of the smallest eigenvalue. The eigenvector corresponding to this eigenvalue on a linear transformation results in the time equalizer filter with maximum SSNR, and thus, minimum residual ISI.

The maximum length of the TEQ filter is limited to the length of the cyclic prefix used as guard samples between the DMT frames. In other systems, a suffix may be used or both a prefix and a suffix as a guard band. The choice is motivated by the complexity and stability of the resulting solution. While increasing the filter length increases the squeeze ratio, the resulting increase in SSNR for filter lengths greater than 32 cyclic prefix (CP) is insignificant relative to the increase in complexity. Further, the C matrix, a square matrix of row and column dimensions equal to the filter tap length, is more likely to be singular for larger tap lengths than smaller. The eigenvalues of the C matrix can be determined if and only if the matrix is invertible (non-singular) and thus, the choice of the filter length is bounded by this constraint.

The inner A and outer B matrix are square matrices of size t, where t is the chosen TEQ filter length. The matrix formed as the product of the outer matrix A and the inverse of the "square root" lower triangle matrix of the inner matrix B has an interesting property. The inner matrix, by definition, has along its diagonal the energy of a moving window of CP samples. This energy decreases from left to right along the t rows of the matrix, as the window moves from right to left, a sample at a time, starting from the optimal window of CP samples. As the window moves left, it includes fewer samples within the optimal window and more samples outside and to the left, until it finally includes only the leftmost sample of the optimal window and t–1 samples outside the window. The off-diagonal elements along a row represent the cross-correlation between a moving window and all the other possible windows. Then by definition, the off-diagonal cross-correlation element for a given row R and column C is equal to the element for the row C and column R, and the resulting inner matrix is symmetric. The "square root" lower and upper triangular matrices of the inner matrix, obtained by a process known as Cholesky decomposition, both also have decreasing values along the main diagonal, and hence, their corresponding inverse matrices have increasing values along the diagonal. The outer matrix, has for its first diagonal element the total energy in the N–CP+t–1 samples outside the optimal window. As the desired optimal filter filters from left to right, more samples from the optimal window are included with all the samples within the optimal window included at the extreme right. Thus, the diagonal elements increase in value from left to right while the off-diagonal elements are the cross-correlation of two moving windows, at different positions with respect to the first element. The matrix C resulting from the product of the outer matrix pre-multiplied with the lower and post-multiplied upper triangle "square root" inverse matrices of the inner matrix has increasing values along the diagonal from left to right. This is because now both the outer matrix A and inverse square root lower and upper triangular matrices of B have increasing values along the diagonal. The "square root" lower and upper triangular matrices of the inner matrix B, determined using Cholesky decomposition, are the transpose of each other for the real, symmetric outside matrix. Consequently, Cholesky decomposition yields a two fold improvement in the speed of the present algorithm compared with conventional LU methods, for example, as taught by Gatherer, U.S. Pat. No. 5,461,640.

The Householder transformation of this C matrix to the tridiagonal form also preserves the increasing values along the diagonal from left to right. The final reduction to the diagonal form from the tridiagonal form is done with another orthogonal transformation technique known as the QL transform. Since the transformation of any matrix to a diagonal eigenvalue representation is an orthogonal transformation, the combined reduction by two such transformations, namely the Householder and QL transforms, to the diagonal form, gives the effective orthogonal transformation matrix as the product of the transform matrices. Thus, reduction from a real, symmetric to diagonal via the tridiagonal form gives the eigenvalues along the diagonal as the output matrix and the effective transform matrix gives the orthogonal eigenvectors along the columns.

As mentioned before, the values along the diagonal are increasing for the input matrix whose eigenvalues are to be determined, and this property of increasing values along the diagonal is preserved in both the tridiagonal form and final diagonal form. Thus, the required smallest eigenvalue is easily found by calculating the first few eigenvalues from the left, thereby eliminating the need to calculate all the eigenvalues to determine the smallest. The eigenvector corresponding to the smallest eigenvalue is then obtained from the effective transformation matrix that is computed alongside the eigenvalues and this vector is used to determine the time domain equalizer filter. The algorithmic details of Cholesky decomposition, Householder reduction, and QL transforms are well known. The entire contents of "Numerical Recipes in C", $2^{nd}$ Edition by W. H. Press, S. A. Teukolsky, W. T. Vetterling, and B. P. Flannery is incorporated by reference herein as necessary for any details deemed essential to an understanding of the present invention.

BRIEF DESCRIPTION OF THE DRAWINGS

The teachings of the invention can be readily understood by considering the following detailed description in conjunction with the accompanying drawings, in which.

DETAILED DESCRIPTION

Figure 5:
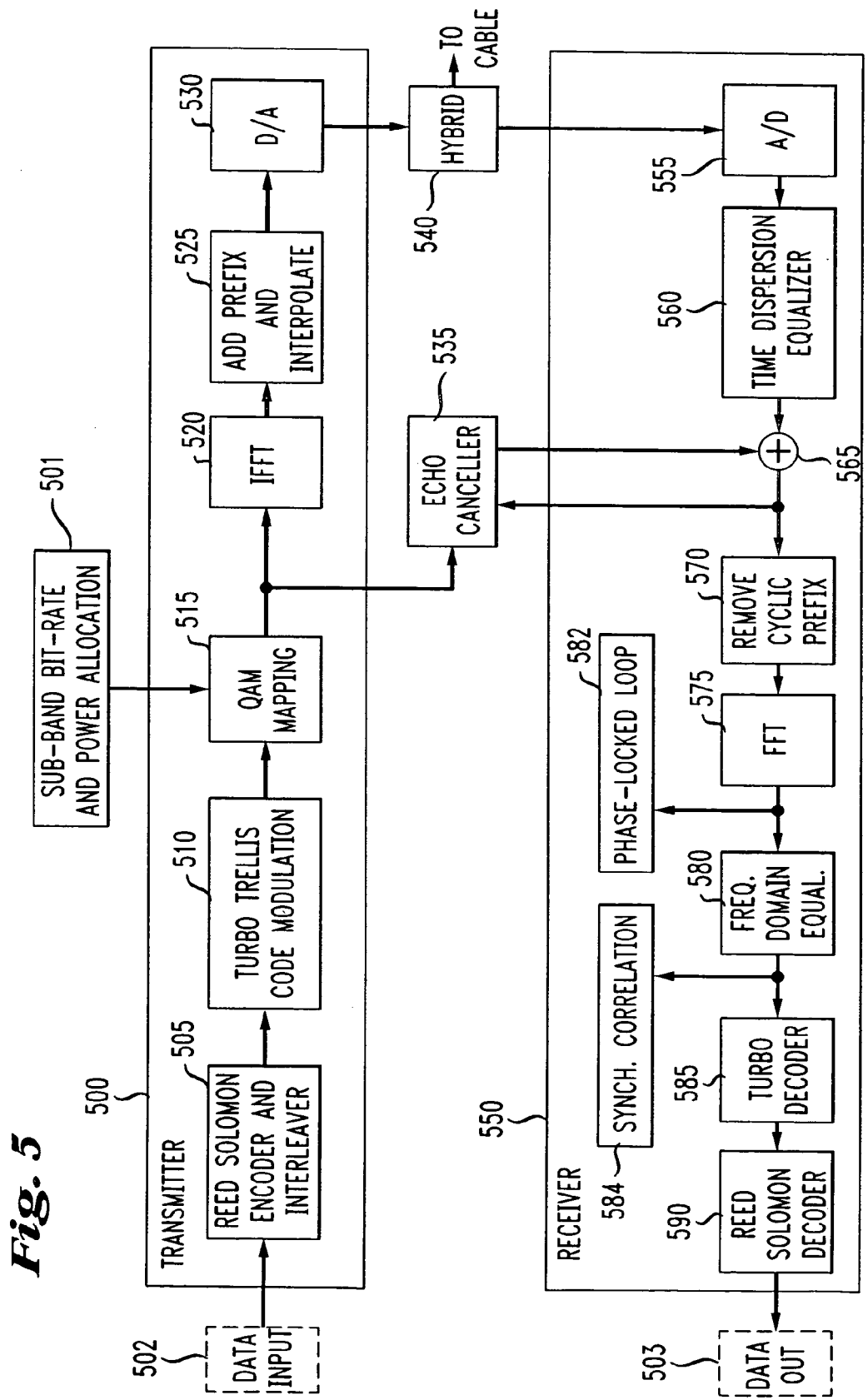
FIG. 5 is a schematic functional block diagram of a conventional TVRC modem used by way of example of a preferred DSL modem.
Figure 6:
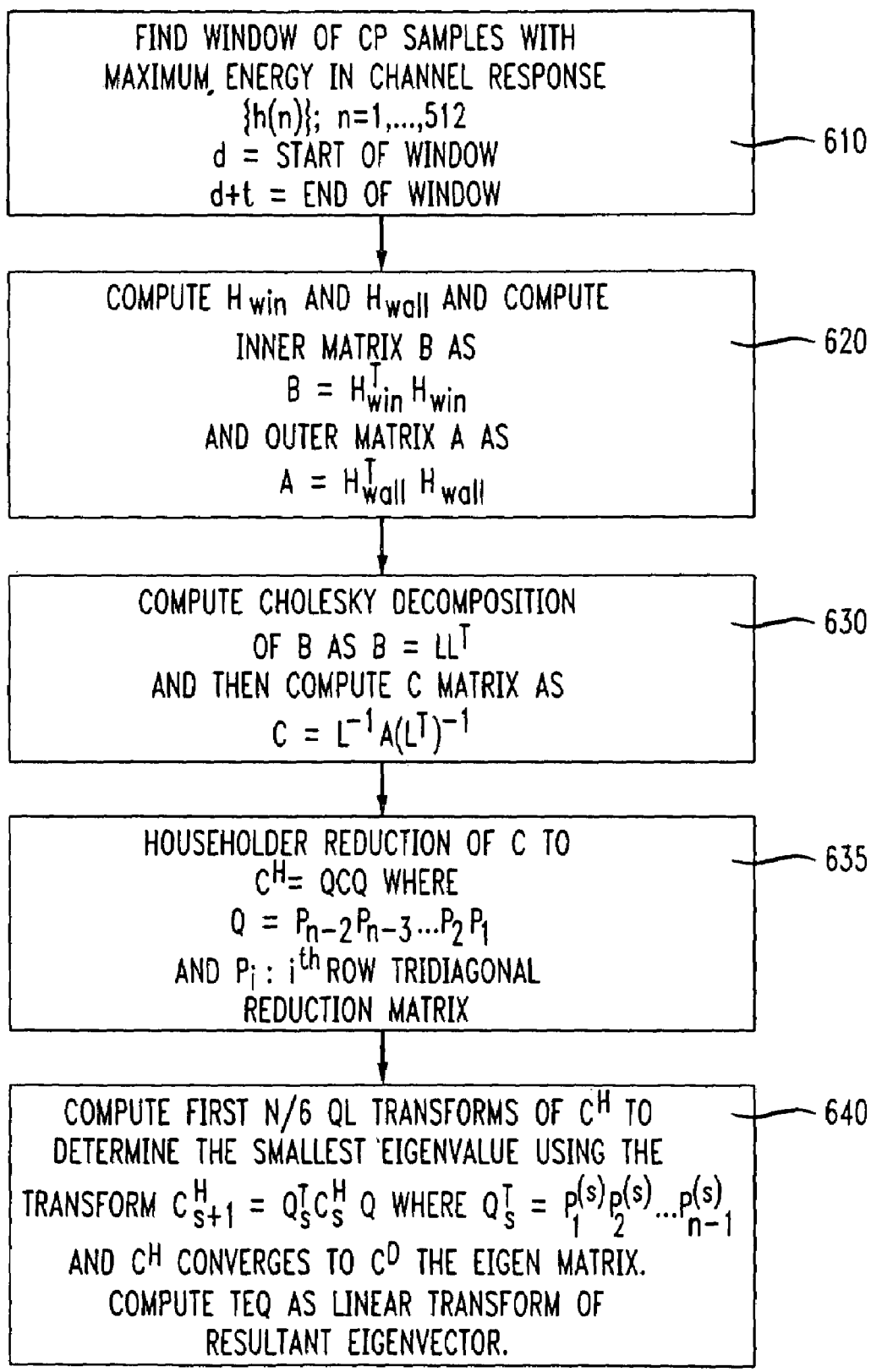
FIG. 6 is a flowchart showing our algorithm for determining equalization values utilizing the sequence of a Cholesky decomposition and Householder reduction to determine time domain equalizer values in accordance with the present invention.

The present invention is described by way of example to a TVRC modem depicted in FIG. 5 but the principles of the algorithm of FIG. 6 may be applied to any digital subscriber line modem known in the art including but not limited to ADSL or other DSL standard used in wired subscriber loops or extended to any data transmission system utilizing a guard band between data streams including orthogonal frequency division multiplexing (OFDM) systems typically used in wireless networks. Moreover, the present algorithm may find application in any digital data transmission system in which data is transmitted with a guard band (for example, a prefix, a suffix or a combination of prefix and suffix) and time domain equalization is used.

Referring to FIG. 5, the channel impulse response measured at a receiver 550 is a convolution of the transmit filters, receive filters, and the physical channel over which data is transmitted. Any physical channel over a few hundred feet in length exhibits signal dispersion; the longer the channel, the more the high frequency loss and the low frequency phase distortion resulting in a highly spread pulse in time. Dispersion causes ISI as discussed above, and with the cyclic prefix fixed at CP samples to maintain orthogonality in frequency and ensure reliable detection, the effective channel measured at the receiver 550 must be shortened to the value of the CP length or less taps. This process of shortening the channel is referred as time domain equalization in DSL parlance though it is actually a shortening of the channel and not an inversion. For the sake of nomenclature, the term "measured channel response" is used to refer to the impulse response measured at the receiver 550 as a convolution of the physical channel with any other filters in the transmitter path post-IFFT 520 and at the receiver 550 prior to the FFT 575 in relation to hybrid 540. The term "effective channel response" refers to the shortened channel response after the TEQ 560 has been applied.

A simplified receiver of a data transmission system in which the present algorithm may be applied comprises an initialization processor for negotiating with a transmitter at a distant end of the data transmission system, a data decoder and a data demodulator including a time domain equalizer and associated filter whose parameters are determined by the present algorithm. According to one embodiment of the invention, the channel response is shortened by designing a linear filter that will effectively shorten the response to within the cyclic prefix number of samples CP. The length of the linear TEQ filter determines the resolution of the filter and hence, its ability to modify the measured channel frequency response. A highly dispersive channel is typically a low-pass filter or a band-pass filter that attenuates the high frequencies required to maintain pulse edges. Shortening an impulse response is equivalent to compressing a signal with long tails and thus, it involves changing the frequency characteristics of the impulse response. A filter with more taps has better resolution to effect the desired change. A tap length that is optimal is also a function of the constraint used to design the filter, as shall be shown in the following discussion.

Figure 1:
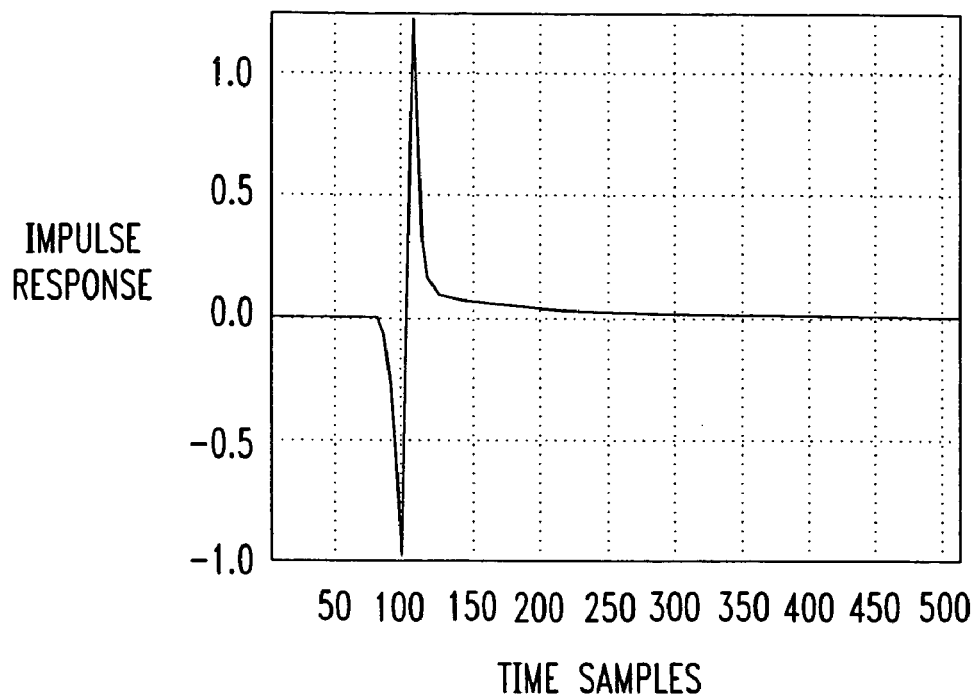
FIG. 1 is a graphical representation of an impulse response of a 12 thousand foot, 26 AWG loop.
Figure 2:
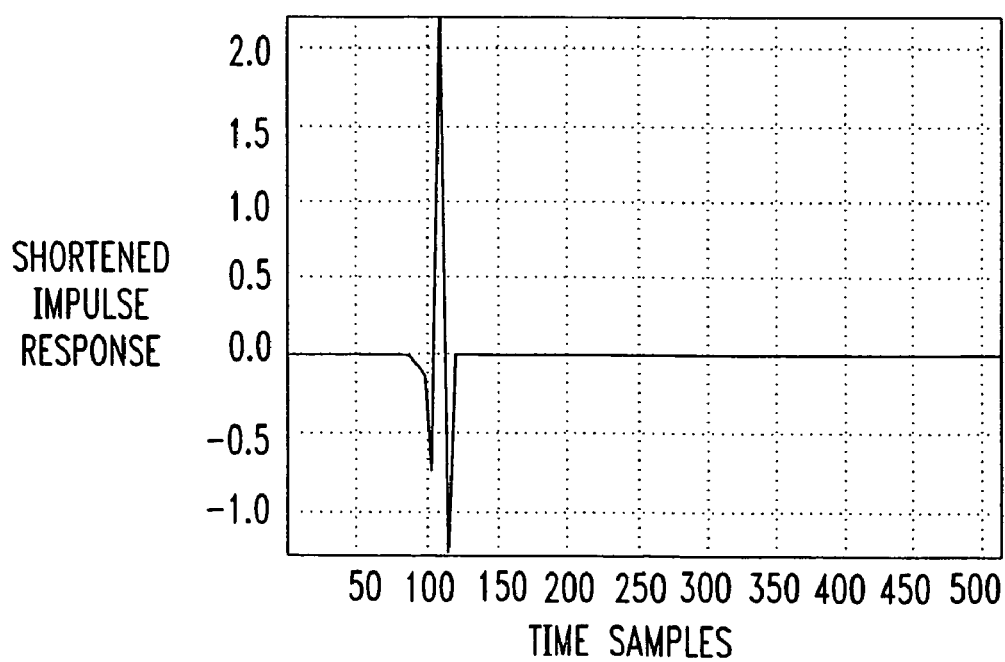
FIG. 2 is a graphical representation of a shortened impulse response on applying a 30-tap filter.
Figure 3:
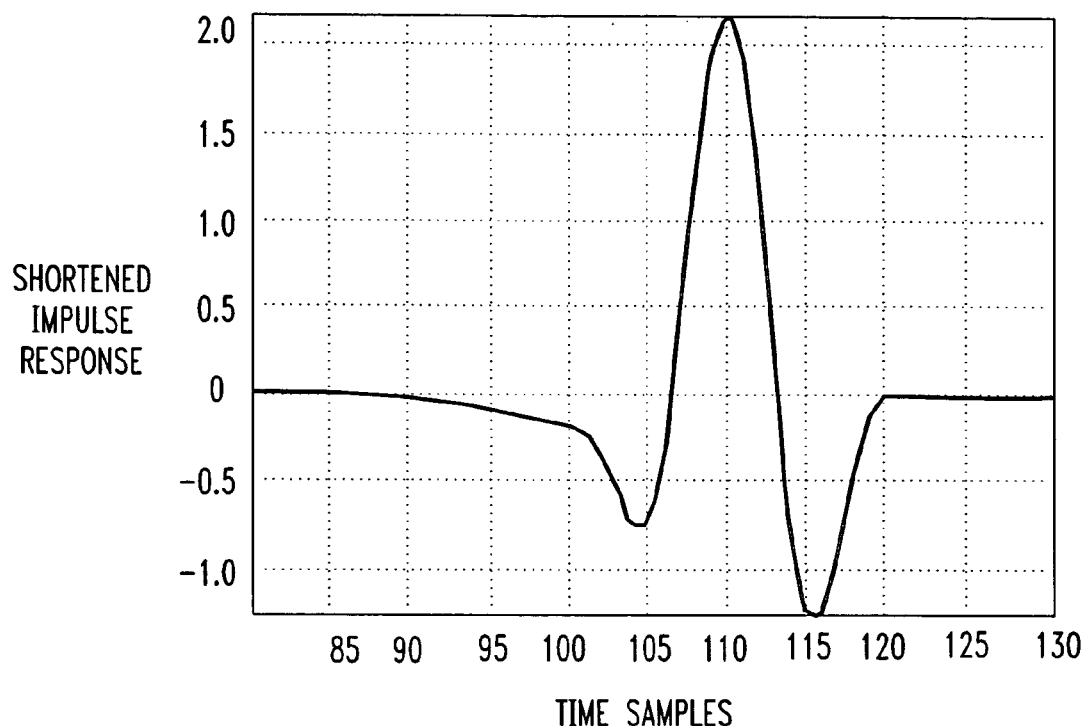
FIG. 3 is a graphical representation of a shortened impulse response on applying a 30-tap filter.

Two important TEQ design parameters are the filter tap length and the window of CP samples with the optimally compressed signal energy. The measured channel impulse response in the time domain is obtained by inverse Fourier transforming the ratio of the time averaged, and hence, noise averaged, received PN frequency response, to the transmitted PN response. The response of a 12,000 foot long, 26 AWG subscriber loop is shown in FIG. 1. FIGS. 2 and 3 show the shortened response after applying the time domain equalizer filter designed as explained below. Denoting the impulse response of the measured channel by h(n) and the TEQ filter by w(n), the incoming data x(n) at the receiver, after passing through the TEQ filter, results in y(n) given as $$y(n)=(h(n)*w(n))*x(n)=h_{\textit{eff}}(n)*x(n) \quad (2)$$

where the symbol * denotes convolution and $h_{\textit{eff}}(n)$ is the effective channel response after convolution with the TEQ filter. If $h_{\textit{eff}}(n)$ is limited to CP samples then the convolution of a frame of x(n) with cyclic prefix (N+CP samples) with the effective channel uses only samples from the present frame and does not involve samples from the previous frame after removal of the cyclic prefix. If however $h_{\textit{eff}}(n)$ is longer than CP taps, then the ISI from filtering the samples $x_p(n)$ of the previous frame required for generating output samples of the present frame poses as noise while decoding thus resulting in a loss in performance.

It is generally not possible to perfectly shorten the effective channel to CP taps regardless of the choice of w(n). There will always be energy outside the CP consecutive taps with the maximum energy. A good criterion for choosing the window of CP samples with maximum energy is the ratio of the energy inside that window to the energy outside, referred to as the shortened signal-to-noise ratio (SSNR). The ratio is also referred to as the squeeze ratio. This is a measure of the residual ISI for the best possible shortening with a given number of taps. It should be noted that the start of the window of CP samples need not necessarily be the first sample as most real channels have a delay before the impulse energy peaks and then falls. This delay has to be adjusted at the receiver 550 for proper synchronization such that the window of CP taps with the maximum energy falls at the beginning of the effective channel impulse response after time domain equalization to avoid significant ISI with either the previous or the next frame. Thus the criterion that we will use to shorten the channel is to maximize the SSNR or the squeeze ratio for a linear time domain equalizer filter design and the maximum allowable tap length. The maximum tap length clearly gives the best performance as the filter precision increases with tap length. The filter length, however, is dependent on the maximum length for which the matrices generated using the impulse response remain positive definite as described below.

According to one embodiment of the invention, the algorithm of FIG. 6 utilizes eigenvalues and eigenvectors to generate the coefficients of the TEQ filter for a given channel impulse response, filter taps, and cyclic prefix length (CP). Using N to represent the length of the channel impulse response, t the filter taps of the TEQ filter, as much of the effective channel's impulse response is forced to lie within CP+1 consecutive samples starting at the delay d and as a consequence minimize ISI. Referring to FIG. 6, the first step of our algorithm 610 is t0 define a window of CP samples with maximum energy in channel response. Let $h_{\textit{win}}$ represent the window of CP+1 consecutive samples of $h_{\textit{eff}}$ starting with sample d, and let $h_{\textit{wall}}$ represent the remaining N+t−CP−2 samples of $h_{\textit{eff}}$. With these definitions, the equations for the $h_{\textit{win}}$ and $h_{\textit{wall}}$ are written as $$h_{win} = \begin{bmatrix} h_{\textit{eff}}(d) \\ h_{\textit{eff}}(d+1) \\ h_{\textit{eff}}(d+2) \\ M \\ h_{\textit{eff}}(d+CP) \end{bmatrix} \quad (3)$$

$$= \begin{bmatrix} h(d) & h(d-1) & \ldots & h(d-t+1) \\ h(d+1) & h(d) & \ldots & h(d-t+2) \\ \vdots & \vdots & \ddots & \vdots \\ h(d+CP) & h(d+CP-1) & \ldots & h(d+CP-t+1) \end{bmatrix} \cdot \begin{bmatrix} w(0) \\ w(1) \\ M \\ w(t-1) \end{bmatrix}$$

$$= H_{win}w$$

$$h_{wall} = \begin{bmatrix} h_{\textit{eff}}(0) \\ h_{\textit{eff}}(1) \\ \vdots \\ h_{\textit{eff}}(d-1) \\ h_{\textit{eff}}(d+CP+1) \\ \vdots \\ h_{\textit{eff}}(N+t-2) \end{bmatrix} \quad (4)$$

$$= \begin{bmatrix} h(0) & 0 & \ldots & 0 \\ h(1) & h(0) & \ldots & 0 \\ \vdots & & \ddots & \vdots \\ h(d-1) & h(d-2) & \ldots & h(d-t) \\ h(d+CP+1) & h(d+CP) & \ldots & h(d+CP-t+2) \\ \vdots & & \ddots & \\ 0 & \ldots & 0 & h(N-1) \end{bmatrix} \begin{bmatrix} w(0) \\ w(1) \\ \vdots \\ w(t-1) \end{bmatrix}$$

$$= H_{wall}w$$

Optimal shortening can be expressed as choosing w to minimize $h_{wall}^T h_{wall}$ while satisfying the constraint that $h_{win}^T h_{win}=1$. Constraining the energy inside the window ensures that the trivial result of $w=[0 \ldots 0]^T$ is disallowed. Normalizing the energy inside to one is only a scale factor change and does not change the effect of the filter response or the squeeze ratio. The energy inside and outside the window can be written as follows:

$$h_{wall}^T h_{wall}=w^T H_{wall}^T H_{wall}w=w^T Aw \quad (5)$$

$$h_{win}^T h_{win}=w^T H_{win}^T H_{win}w=w^T Bw \quad (6)$$

where A and B are symmetric and positive semidefinite matrices. Optimal shortening can be achieved by choosing w as to minimize $w^T Aw$ while satisfying the constraint $w^T Bw=1$.

The above minimization problem can be formulated as a constrained minimization problem:

$$D=w^T Aw-\lambda(w^T Bw-1) \quad (7)$$

$$\frac{\partial D}{\partial w}=Aw-\lambda Bw=0 \Rightarrow Aw=\lambda Bw \quad (8)$$

which is the so-called generalized eigenproblem where A and B are both matrices. When B is non-singular the above equation is equivalent to $$(B^{-1}A)\cdot x=\lambda x \quad (9)$$

In this case A and B are symmetric matrices and B is positive definite but the matrix $B^{-1}A$ is not symmetric. However, a symmetric eigenvalue problem can be recovered by using the Cholesky decomposition $B=LL^T$ where L is the lower triangle "square root" matrix. Rewriting the above equation, we get $$(L^T)^{-1}L^{-1}Ax=\lambda x \Rightarrow L^{-1}Ax=\lambda L^T x \Rightarrow L^{-1}A(L^T)^{-1}(L^T)x=\lambda L^T x \quad (10)$$

$$C(L^T x)=\lambda(L^T x) \text{ where } C=L^{-1}A(L^{-1})^T \quad (11)$$

It can be shown that the matrix C is symmetric and its eigenvalues are the same as those of the generalized eigenproblem of equation (8) and its eigenfunctions or vectors are $L^T x$.

The second step then of our algorithm is to compute $H_{win}$ and $H_{wall}$ and computer inner matrix B and outer matrix A as follows. Throughout this formulation, it is assumed that B is invertible. The maximum possible number of taps for a given channel and hence, the matrix B is determined by the largest tap for which B is positive definite. Typical DMT transceivers use a TEQ tap length that is less than or equal to the length of the cyclic prefix (CP). This choice is motivated by the increased complexity in determining the filter for a relatively insignificant increase in squeeze ratio and the existence of the inverse of the B matrix with increasing tap lengths. The rows of $H_{win}$ consist of shifted windows of the measured channel impulse response and for all t for which rank $(H_{win})$=t, B will be positive definite and thus can be Cholesky decomposed at step 630 into an upper and lower (transpose of upper) triangle matrices. It should be noted that the Cholesky decomposition, when used appropriately, is about a factor of two faster than alternative methods for solving linear equations. Expressing B as the product of two square root matrices, we derive the generalized eigenproblem described by equations (7) through (9) for this case using Cholesky decomposition as $$B=Q\Lambda Q^T=(Q\sqrt{\Lambda})(Q\sqrt{\Lambda})^T=(\sqrt{B})(\sqrt{B})^T \quad (12)$$

where $\Lambda$ is a diagonal matrix formed from the eigenvalues of B and the columns of Q are the corresponding orthonormal eigenvectors. Since B is full rank, the matrix $((\sqrt{B})^{-1}$ exists.

Satisfying the constraint on $w^T B w$ define $$y=\sqrt{B}^T w \Rightarrow y^T y=w^T \sqrt{B}\sqrt{B}^T w=w^T B w=1 \quad (13)$$

$$\therefore w=(\sqrt{B}^T)^{-1}y \Rightarrow w^T A w=y^T(\sqrt{B})^{-1}A(\sqrt{B}^T)^{-1}y=y^T C y \quad (14)$$

where C is appropriately defined. Thus, optimal shortening is choosing y such that $y^T C y$ is minimized while constraining $y^T y=1$. The solution to this problem is solved by choosing $y=e_{min}$ where $e_{min}$ is the orthonormal eigenvector corresponding to the minimum eigenvalue of C. The matrix C is symmetric and since $w^T A w$ is positive and non-zero for a non-trivial TEQ, the eigen solutions of C are positive. The resulting TEQ filter $W_{opt}$ is given as $$W_{opt}=(\sqrt{B}^T)^{-1}e_{min} \quad (15)$$

and the shortened signal-to-noise ratio (SSNR) can be expressed as $$SSNR_{opt}=10\log\left(\frac{w_{opt}^T B w_{opt}}{w_{opt}^T A w_{opt}}\right)=10\log\left(\frac{1}{\lambda_{min}}\right)=-10\log(\lambda_{min}) \quad (16)$$

The optimal algorithm uses the channel impulse response to compute the C matrix from the inside and outside matrices $H_{win}$ and $H_{wall}$, which determine the energy inside and outside the window with maximum squeeze ratio. Determining the minimum eigenvalue is mathematically straightforward but from a machine (finite precision) implementation perspective, the choice of the algorithm to compute the minimum eigenvalue and the corresponding eigenvector decides the precision and accuracy of the TEQ filter. This, in turn, affects the residual ISI and system performance. Literature surveys indicate that while the solution can be mathematically expressed in closed form, algorithms to determine the smallest eigenvalue accurately are computationally complex for real-time implementations. Most papers and patents recommend the inverse iteration method for iteratively determining the smallest eigenvalue and the corresponding vector with an initial guess.

The inverse iterative method uses an iterative procedure to determine the eigenvector and eigenvalue using an initial guess for the eigenvalue. This iterative method converges well for non-degenerate, widely separated eigenvalues assuming an initial guess close to the smallest eigenvalue is started with. Mathematically, for a matrix C with the smallest eigenvalue $\lambda_s$ and corresponding smallest vector $x_s$ that need to be determined, an eigenvalue guess of $\tau$ and an eigenvector guess of y are started with such that $$(C-\tau 1)y=b \quad (17)$$

where b is a random vector and y and b can be expressed using the eigenvector basis as $$y=\sum_i a_i x_i \quad b=\sum_i \beta_i x_i \quad (18)$$

$$\text{gives } \sum_i a_i(\lambda_i-\tau)x_i=\sum_i \beta_i x_i$$

$$\text{Thus, } a_i=\frac{\beta_i}{\lambda_i-\tau} \quad y=\sum_i \frac{\beta_i x_i}{\lambda_i-\tau}$$

If $\tau$ is close to $\lambda_s$, the smallest eigenvalue, then provided $\beta_s$ is not small, y will be approximately $x_s$. Every iterative stage gives another power of $\lambda_s-\tau$ in the denominator thus speeding the convergence for well-separated eigenvalues. Thus, for the $k^{th}$ iteration, since y is an improved approximation to $x_s$, we normalize it and set $$b_{k+1}=\frac{y}{|y|} \quad (b_k \text{ normalized to unity}) \quad (19)$$

$$\text{where } (A-\tau_k 1)\cdot y=b_k$$

The exact eigenvalue and eigenvector satisfy $$A\cdot x_s=\lambda_s x_s \Rightarrow (A-\tau_s 1)\cdot x_s=(\lambda_s-\tau_s)x_s \quad (20)$$

To get an improved estimate of the eigenvalue we substitute our improved guess y for $x_s$ in equation (17) above. The left-hand side is $b_k$ and so calling $\lambda_s$ the new value $\tau_{k+1}$, thus $$\tau_{k+1} = \tau_k + \frac{1}{b_k \cdot y} \qquad (21)$$

While the equations, for the iteration, are straightforward, actual implementation can be difficult, since at each stage of the iteration as the eigenvalue approaches the desired smallest eigenvalue, a set of linear equations have to be solved for the eigenvector. Most of the computational load occurs in solving the linear system. Reducing the matrix to a desirable special form like the tridiagonal form for symmetric matrices allows an easier solution. Inverse iteration using LU (lower-upper triangle) decomposition can be used to determine the eigenvector. The computational complexity for the iterative procedure is $O(N^2)$ in operations if the eigenvalue is not updated and $O(N^3)$ if the eigenvalue is updated, with the latter being desirable for reasons of accuracy. While O(N3) is acceptable complexity for the iterative procedure ($N \leq 32$) using with high-speed signal processors that are easily available and affordable, the dependence of the system performance on the accuracy of the designed time domain equalizer makes it desirable to determine the eigenvalue and the corresponding eigenvector with more accurate methods.

The choice of the initial eigenvalue τ and the random vector b determines the convergence of the iterative method and a good initial guess is essential for fast convergence. Further, for degenerate systems or systems with eigenvalues spaced closely, more accurate convergence requires perturbation of the last significant digits of the initial estimate τ. As mentioned earlier, the residual ISI (energy outside the CP-taps) present in the shortened channel is inversely proportional to the maximum squeeze ratio achievable for a given tap length. Residual ISI results in noise to the data samples in the time domain or inter-channel interference in the frequency domain that cannot be eliminated thus causing loss in throughput and increase in BER. It is thus imperative to design a TEQ with minimal residual and the utmost accuracy possible. It should also be noted that the TEQ is determined only once during initialization and is updated only if the channel parameters change over a long period of time. The computational load in determining the TEQ accurately is thus worth the resulting improvement in system performance and throughput.

The power method on the other hand determines the maximum eigenvalue of the inverse matrix, which for a real symmetric matrix is the inverse of the smallest eigenvalue. Starting with a random vector, and assuming that this random vector has a component along the eigenvector with the largest eigenvalue, repeated iterations of the matrix vector product should result in the eigenvector corresponding to the largest eigenvalue dominating. The rate of convergence of the iterations depends upon the ratio of $|\lambda_1/\lambda_2|$ where $|\lambda_1| \geq |\lambda_2| \geq \ldots \geq |\lambda_{11}|$ are the eigenvalues and $\lambda_1$ is the desired maximum eigenvalue. This method has the same accuracy issues as the inverse iteration method. It also has the additional complexity of determining the inverse matrix whose largest eigenvalue has to be determined.

According to one embodiment of the invention, an accurate method for determining the smallest eigenvalue without having to determine all the eigenvalues is disclosed. This method not only ensures the design of an optimal time equalizer for a given tap size to machine precision but also reduces the complexity of accurately determining the smallest eigenvalue by exploiting the property of the matrices used. The method we suggest involves orthogonal transformations of the real symmetric C matrix first to a symmetric tridiagonal form in CP steps and finally to the diagonal form with cubic or at worst quadratic convergence. The method uses the Householder reduction, step 635, (orthogonal transformation) to transform the symmetric C matrix, whose smallest eigenvalue is to be determined, to a tridiagonal form followed by the QL transform with implicit shifts (orthogonal-lower triangle representation) to find the smallest eigenvalue (diagonalization). The product of the two orthogonal transformations is the effective transformation matrix for diagonalization and its columns are the eigenvectors of the C matrix. Further exploiting the property of increasing values along the main diagonal in the C matrix that results from windowing the impulse response, we obtain an ascending ordered diagonal matrix, and thus, limit the algorithm to determine the smallest eigenvalue without determining all of them. This method ensures that the eigenvalue found is the smallest and the corresponding eigenvector will result in an optimal time domain equalizer to within machine precision.

Householder reduction is a method of converting a real symmetric matrix to a symmetric tridiagonal form by a series of rotational shifts that are characterized by orthogonal transformations. The Householder reduction method is a modification of the Jacobi method of plane rotations. Reduction of a matrix to a tridiagonal form by rotationally transforming the rows and columns of a matrix can be carried out in a finite number of steps, unlike the Jacobi method of reduction to the diagonal that requires the iteration to converge. The attraction of the Householder transformation is that it reduces a symmetric matrix to tridiagonal form by n−2 orthogonal transformations where n is the size of the input square matrix C. The basic ingredient is the Householder matrix P, which has the form $$P = 1 - 2ww^T \text{ where } w \in R^n \text{ and } |w|^2 = 1 \qquad (22)$$

The matrix P is orthogonal, because $$\begin{aligned} P^2 &= (1 - 2ww^T) \cdot (1 - 2ww^T) \\ &= 1 - 4ww^T + 4w(w^Tw)w^T \\ &= 1 \end{aligned} \qquad (23)$$

Therefore, $P = P^{-1}$. But $P^T = P$, and so $P^T = P^{-1}$, proving orthogonality. Rewrite P as $$P = 1 - \frac{uu^T}{H} \quad \text{and} \quad H = \frac{1}{2}|u|^2 \qquad (24)$$

where u can now be any vector. If $e_1$ is the unit vector [1, 0, ..., 0], choose u as shown, with the choice of signs made later, $$u = x \pm |x| e_1$$

Then, $$P \cdot x = x - \frac{u}{H} \cdot (x \pm |x| e_1)^T \cdot x \qquad (25)$$

$$= x - \frac{2u \cdot ((|x|^2 \pm |x| x_1)^T}{2|x|^2 \pm 2|x| x_1}$$

$$= x - u$$

$$= \pm |x| e_1$$

Similarly, $$x^T \cdot P = \pm |x| e_1^T \qquad (26)$$

Thus, the Householder matrix acts on a given vector to zero all its elements except the first one. To reduce a symmetric matrix C to tridiagonal form, we choose the vector x for the first Householder matrix to be the first column. Then the lower n−2 elements will be zeroed. Likewise premultiplying with the P matrix also zeroes the n−2 row elements for the first row, resulting in a matrix with only the diagonal and one super-diagonal and sub-diagonal element in the first column and second row respectively. Thus, C'=P·C·P is the complete orthogonal transformation for the first row and column tridiagonalization procedure. A sequence of such transformations would convert all the rows and columns to appear tridiagonal and for a symmetric matrix, this results in a symmetric tridiagonal form. The effective transformation can be written as $$P_T = P_1 P_2 \ldots P_{n-2} \qquad (27)$$

If the eigenvalues and eigenvectors of the tridiagonal matrix C' are found, then the eigenvectors of the original symmetric matrix C are obtained by applying the effective transformation matrix $P_T$ to the orthogonal transformation matrix $Q_T$ of eigenvectors of the tridiagonal form. The routine that implements the Householder reduction 635 also determines the effective transformation matrix $P_T$ and these outputs are passed on to the next routine that transforms the tridiagonal matrix to a diagonal form.

The complexity of the Householder reduction method is $4N^3/3$ multiply-accumulate operations which for N<CP (=32) is realizable in real-time with present day signal processors. Ideally N should be set to the maximum tap size of CP, provided the NxN matrix B is positive definite. The matrix C with increasing values from left to right along the diagonal and the sub- and super- diagonals is well suited for the Householder reduction routine. This is because the reduction is done from the bottom right-hand corner to the left and a mixture of small and large values along the diagonal can lead to considerable rounding errors.

The routine to convert to the diagonal form uses the QL algorithm, step 640, that consists of a sequence of orthogonal transformations:

$$A_s = Q_s \cdot L_s A_{s+1} = L_s \cdot Q_s (= Q_s^T \cdot A_s \cdot Q_s) \qquad (b\ 28)$$

where the idea that any real matrix can be decomposed in the form given in equation (25) as a product of an orthogonal matrix Q and a lower triangular matrix L is used. For a general matrix, the decomposition is constructed by applying Householder transformations to annihilate successive columns of A above the diagonal. Since Q is orthogonal, $L = Q^T \cdot A$ is obtained which results in an orthogonal transformation of A as $A = Q^T \cdot A \cdot Q$. The theorem that is the basis of the algorithm for a general matrix A is: (i) If A has non-degenerate eigenvalues of absolute value $|\lambda_i|$, then $A_s \to$ lower triangular form] as $s \to \infty$. The eigenvalues appear on the diagonal in increasing order of absolute magnitude. (ii) If $A_s$ has an eigenvalue $|\lambda_i|$ of multiplicity p, then $A_s \to$ [lower triangular form] as $s \to \infty$, except for a diagonal block matrix of order p, whose eigenvalues $\to |\lambda_i|$. While the workload for a general real matrix is $O(N^3)$ per iteration, it is only $O(N)$ for a tridiagonal matrix thus making it highly efficient on these forms.

For the case of a real symmetric tridiagonal matrix A, all the eigenvalues $\lambda_i$ are real. According to the theorem, if any $\lambda_i$ has a multiplicity p, then there must be at least p −1 zeros on the sub- and super-diagonal. Thus, the matrix can be split into matrices that can be diagonalized separately, and the complication of diagonal blocks that can arise in the general case is irrelevant. In proof of the theorem above, it can be shown that in general a super-diagonal element converges to zero like $$a_{ij}^s \left( \frac{\lambda_i}{\lambda_j} \right)^s \qquad (29)$$

When $\lambda_i$ is close $\lambda_j$, convergence is accelerated by the technique of shifting: If k is any constant, then A−kI has eigenvalues $\lambda_i − k$. If we decompose $$A_s - k_s 1 = Q_s \cdot L \Rightarrow A_{s+1} = L_s \cdot Q_s + k_s I\ A_{s+1} = Q_s^T \cdot A_s \cdot Q_s \qquad (30)$$

then the convergence is give by the ratio $$\frac{\lambda_i - k_s}{\lambda_j - k_s}.$$

The idea is to choose the shift $k_s$ at each stage to maximize the rate of convergence. A good choice for the shift initially would be $k_s$ close to $\lambda_j$, the smallest eigenvalue. Then the first row of off-diagonal elements would tend rapidly to zero. However $\lambda_j$ is not known apriori. A very effective strategy in practice is to compute the eigenvalues of the leading 2x2 diagonal submatrix of A and then set $k_s$ equal to the eigenvalue closer to $a_{11}$. This improves the convergence to cubic or at worst quadratic for degenerate cases. With shifting, the eigenvalues do not appear on the diagonal in increasing absolute magnitude but for a matrix with increasing values from left to right and large dynamic range between the largest and smallest eigenvalue, the general order of the eigenvalues along the diagonal is increasing. Since only the smallest eigenvalue is desired, we limit the eigenvalues determined are limited to the first N/6 eigenvalues. The choice of N/6 ensures that the smallest eigenvalue is found accurately, allowing for small shifts from the ascending order along the diagonal. In practice N is generally CP−1 (=31) and N/6=5 has been found sufficient to determine the smallest eigenvalue. The average count per iteration is O(N), with fairly large coefficient say, ~20N. The total operation count for the partial (one-sixth) diagonalization is then $20n \times 2n \sim 40n^2 < 1.3N^2$ where 2 is the average number of iterations for the first few eigenvalues to be determined and n=N/6. Thus, determining the required eigenvalue is an $O(N^2)$ operation. Further, using the QL shift method to determine the corresponding eigenvector as a product of the tridiagonal to diagonal orthogonal matrix with the tridiagonal transformation matrix is an additional workload of $3(N/6)^3 = N^3/18$. This is less than $1.8N^2$ for $N \leq 32$ operations thus resulting in a total maximum complexity of $3N^2$.

The QL decomposition of a tridiagonal matrix is effected by a sequence of plane rotations $P_{pq}$ where the application of the place rotation $P_{pq}$ reduces the row p and column q to the desired form. One uses the sequence $P_{12}, P_{23}, \ldots, P_{n-1,n}$ to annihilate the elements $a_{12}, a_{23}, \ldots, a_{n-1,n}$. By symmetry, the sub-diagonal elements $a_{21}, a_{32}, \ldots, _{n,n-}$ will be annihilated too. Thus each $Q_s$ is a product of place rotations:

$$Q_S^T = P_1^{(s)} \cdot P_2^{(s)} \ldots P_{n-1}^{(s)} \qquad (31)$$

where $P_1$ annihilates $a_{12}$. Note that it is in equation (31), $Q^T$ not Q, because we defined $L = Q^T$.

Subtracting a large value of $k_s$ from the diagonal elements can result in loss of accuracy for the small eigenvalues when the elements of A vary widely in magnitude, as would be the case for the C matrix and its tridiagonal form. This difficulty is avoided by using the QL algorithm with implicit shifts instead. The implicit QL algorithm is mathematically equivalent to the original QL algorithm, but does not require the subtraction of $k_s I$ from A. The effective orthogonal transformation can be written as:

$$C_D = Q_S^T C_D^T Q_S = Q_S^T Q_{TD}^T C Q_{TD} Q_S \qquad (32)$$

where $C_D$ is the resultant diagonal matrix, $Q_s$ is the tridiagonal to diagonal effective orthogonal transformation matrix and $Q_{TD}$ is the orthogonal matrix that transforms C to a tridiagonal form $C_{TD}$. Thus, the effective orthogonal transformation matrix $Q_{eff}$, the matrix of orthonormal eigenvectors of the C matrix is given as:

$$Q_{eff} = Q_S Q_{TD} \Rightarrow C_D = Q_{eff}^T C Q_{eff} \qquad (33)$$

The eigenvalues are determined from the left to right by reducing the tridiagonal matrix using the Jacobi plane rotation and the Givens orthogonal transformation (QL transformation with implicit shifts) until the iteration converges to within machine precision. Thus, the smallest eigenvalues and the associated eigenvectors are determined first. This method of using the Householder reduction 635 to obtain the tridiagonal form followed by QL shifts 640 to determine the smallest eigenvalue without determining all the eigenvalues is made possible by the choice of the window 610 used to determine the TEQ filter. The window of CP-taps is chosen at step 610 such that maximum energy of the measured channel response lies within the window thus maximizing the energy within CP-taps of the equalized channel for a given tap size.

The inner A and outer B matrix obtained from $H_{win}$ and $H_{wall}$ respectively at step 620 are square matrices of size t, where t is the chosen TEQ filter length. The matrix C formed as the product of the outer matrix A and the "square root" (lower triangle) $\sqrt{B}$ of the inner matrix B has an interesting property that has been exploited to determine the smallest eigenvalue without determining all the eigenvalues. The inner matrix, by definition, has along its diagonal the energy of a moving window of CP samples. This energy decreases from left to right along the t rows of the matrix, as the window moves from right to left, a sample at a time, starting from the optimal window of CP samples. As the window moves left, it includes fewer samples within the optimal window and more samples outside to the left, until it finally includes only the leftmost sample of the optimal window and t−1 samples outside the window. The off-diagonal elements along a row represent the cross-correlation between a moving window and all the other possible windows. Then by definition, the off-diagonal cross-correlation element for a given row R and column C is equal to that for the row C and column R, and the resulting inner matrix is symmetric. The "square root" lower and upper triangular matrices of the inner matrix, obtained by Cholesky decomposition, both also have decreasing values along the main diagonal, and hence, their corresponding inverse matrices have increasing values along the diagonal. The outer matrix, has for its first diagonal element the total energy in the N−CP+t−1 samples outside the optimal window. As the desired optimal filter filters from left to right more samples from the optimal window are included with all the samples within the optimal window included at the extreme right. Thus, the diagonal elements increase in value from left to right while the off-diagonal elements are the cross-correlation of two moving windows, at different positions with respect to the first element. The matrix C resulting from the product of the outer matrix pre-multiplied with the lower and post-multiplied upper triangle "square root" inverse matrix of the inner matrix has increasing values along the diagonal from left to right. This is because now both the outer matrix A and inverse square root lower and upper triangular matrices of B have increasing values along the diagonal. The "square root" lower and upper triangular matrices of the inner matrix B, determined using Cholesky decomposition, step 630, are the transpose of each other for the real, symmetric outside matrix.

Transformation of the C matrix to the tridiagonal form preserves the increasing values along the diagonal from left to right. The final reduction to the diagonal form from the tridiagonal form is done with another orthogonal transformation technique known as the QL transform. The QL transform step 640 also preserves the general ascending order of the eigenvalues determined from left to right. If the QL algorithm without shifts were used, then the eigenvalues will be ordered in increasing values along the diagonal. QL transform with implicit shifts ensures faster convergence but since the shifts compare only adjacent eigenvalues, the general increasing order of the eigenvalues in still maintained. Further, the dynamic range between the largest and smallest eigenvalue is significantly large as the energy in the moving window of the impulse response increases by several dB from left to right, where it matches the optimal window of maximum energy. Thus, the eigenvalues increase rapidly towards the largest along the diagonal with minor perturbations to the order and the desired smallest eigenvalue can be determined from the first few eigenvalues.

The computational complexity of a routine used in determining the minimum eigenvalue is determined as the sum of all the arithmetic and logical operations required by the routine. These arithmetic operations can be further expressed as a number of multiply-add instructions, where typically a multiply-add instruction takes one machine cycle. Once the CP window is defined, the various routines and the associated complexities for an N-tap filter are:

i. computing the inside and outside matrices $H_{win}$ and $H_{wall}$ is of order 8N (step 620)

ii. Cholesky decomposition is $N^3/6 \sim 5N^2$ for $N \leq 32$ (Typical choice of N=30) (step 630)

iii. forming the C matrix is $N^3/2$ multiply-adds (exploiting upper-lower triangle matrix properties and symmetric nature of C) (step 630)

iv. Householder reduction to diagonal form is $4N^3/3$ (step 635)

v. First N/6 eigenvalues and corresponding eigenvectors using QL transform is $\leq 3N^2$. (step 640)

vi. Time equalizer vector from smallest eigenvector (matrix-vector product) $N^2$.(step 640)

The first three steps above are common to any method that determines a linear equalizer optimized for the minimum mean squared error criterion. The overall complexity, as indicated above, using orthogonal transformations to determine the eigenvalue of the real symmetric matrix C is less than or equal to $1.5N^3$ with the upper bound for the case of the largest TEQ filter length of N=32 (=CP). As mentioned earlier, the inverse iterative approach with eigenvalue updating has a complexity of the order of $O(N^3)$ per iteration and even for the best case choice of the initial eigenvalue, the total complexity of this method is greater than that of our approach. Further, the number of iterations, and hence, complexity required to converge to the smallest eigenvalue increases with increasing values of the initial guess. The accuracy of the inverse iterative method relative to the assured convergence and accuracy of the resulting eigenvalue and vector using the QL shift method make the orthogonal transformation method a more computationally efficient way of obtaining the theoretically optimal time equalizer with the maximum machine accuracy possible. The above algorithm can be easily implemented in real-time for 32-bit digital signal processors.

Figure 4:
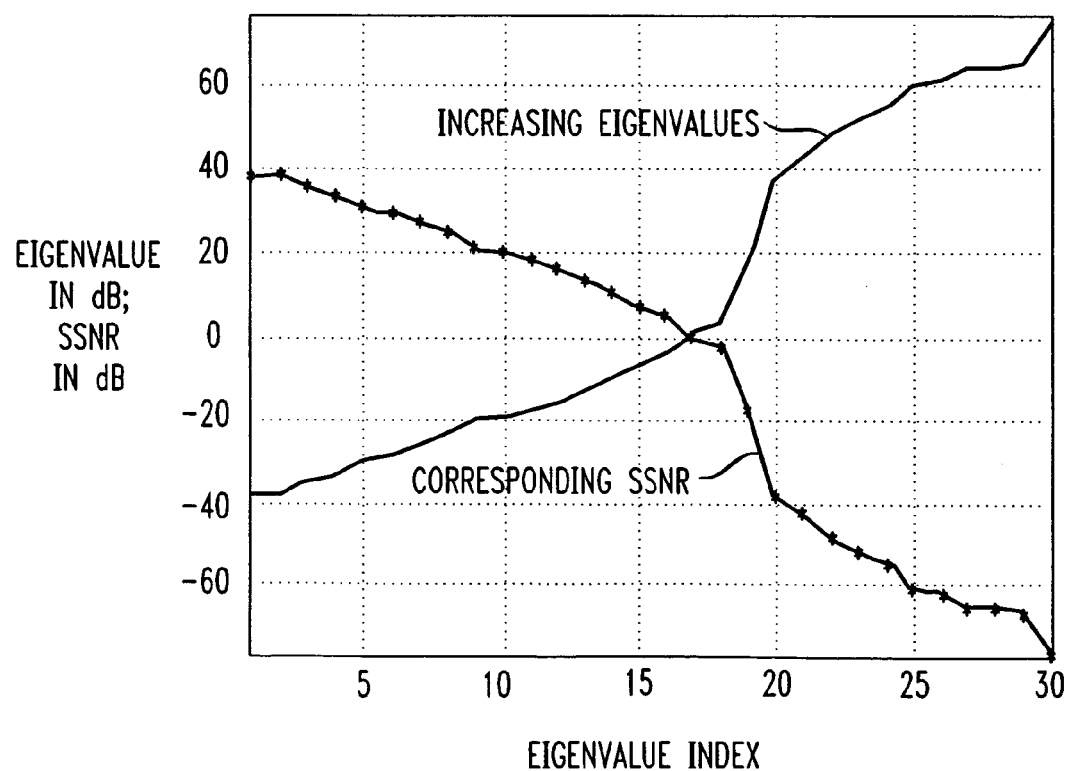
FIG. 4 is a graphical representation of all the eigenvalues for a subscriber loop of length twelve thousand feet and 26 AWG wire and supports our contention that we need not find all the eigenvalues and the squeeze ratio (SSNR) reflecting how much energy is compressed in the 32 tap final response.

FIG. 4 is a graphical representation of eigenvalues and corresponding SSNR for a twelve thousand foot twenty-six gauge American National Standards Institute (ANSI) digital subscriber loop determined in accordance with our algorithm. Given that length loop, the choice of filter tap length is 30. The Figure demonstrates a typical range of eigenvalues and that the range is large enough to use our algorithm because eigenvalues show along the diagonal in ascending order in the final output diagonal matrix and proves that only a few values need be found to quickly determine the smallest eigenvalue. Moreover, it shows the SSNR and squeeze ratio that reflects the amount of energy compressed into the required 32 tap final response.

Although the present invention has been described in connection with the preferred embodiments of the invention in relation to a TVRC modem, that type of DSL modem is not the only DSL modem that may utilize the principles of the present invention and the present invention should not be deemed limited to application only in a DSL architecture. All United States patents, patent applications and articles referenced herein should be deemed to be incorporated by reference as to their entire subject matter. Moreover, it will be understood by those of ordinary skill in the art that many modifications can be made thereto within the scope of the claims which follow. Accordingly, it is not intended that the scope of the invention in any way be limited by the above description, but that it be determined by reference to the claims that follow.

We claim:

1. A method for suppressing noise resulting from inter-symbol interference (ISI) in a receiver for use in a digital data transmission system, comprising the steps of:
    computing a time domain equalizer at the receiver during initialization between the receiver and a transmitter on a channel;
    determining a time domain impulse response of the channel;
    determining said time domain equalizer at said receiver by employing a linear transform of an eigenvector corresponding to the smallest eigenvalue of a matrix derived from the impulse response; and
    filtering received data using the time domain equalizer to minimize inter-symbol interference at said receiver
    wherein said step of determining a time domain impulse response comprises the step of choosing a window of length equal to or less than a guard band sample length of consecutive samples of impulse response having the largest total energy.

2. A method executed in a receiver comprising the steps of:
    determining a window of length equal to or less than a number of guard band samples of a received digital data signal;
    computing an inverse Cholesky decomposition responsive to the determining step;
    computing a Householder reduction responsive to the Cholesky decomposition;
    performing a QL transform responsive to the Householder reduction; and determining a time domain equalizer as a linear transform of a resultant eigenvector from the QL transform step.

3. A method as recited in claim 2 wherein said steps are performed via a digital signal processor of a digital communication device.

4. A method executed in a receiver for determining parameters of a time domain equalizer in said receiver comprising the steps of:
    determining a window of maximum energy in an impulse response of length equal to or less than a number of guard band samples associated with a received digital data signal;
    computing corresponding inner and outer matrices;
    performing an inverse Cholesky decomposition of the inner matrix; and
    creating a resultant matrix as the product of the outer matrix and an upper and lower square root inner matrix; and
    setting parameters of said time domain equalizer to correspond do the linear transformation of an eigenvector corresponding to the smallest eigenvalue of said resultant matrix.

* * * * *